Jan. 17, 1956  C. E. FAULK ET AL  2,730,836
GOOSE CALLER
Filed July 12, 1954
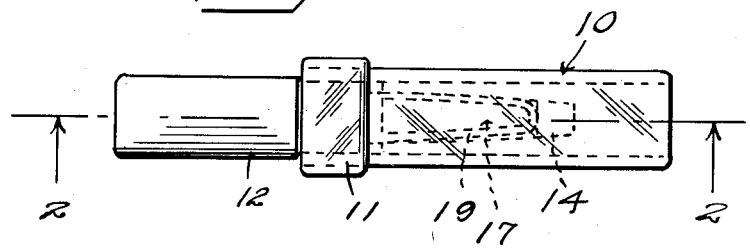
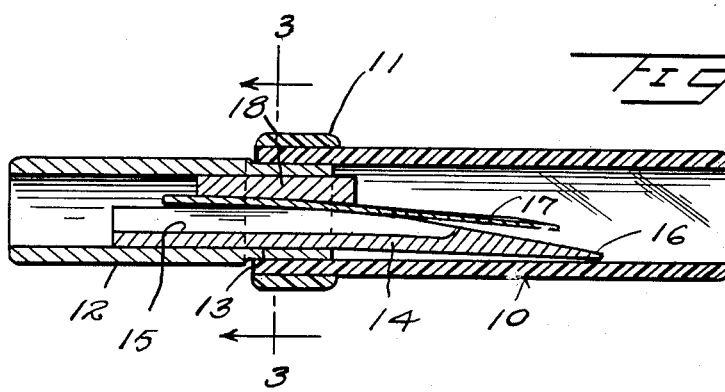
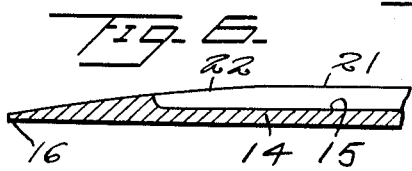
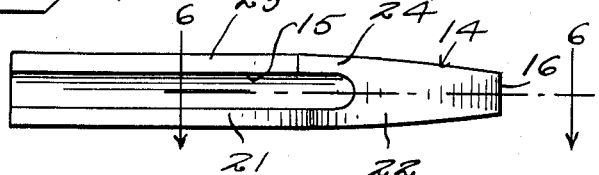
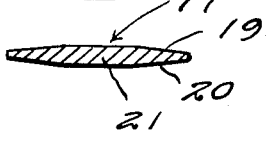
INVENTORS
Clarence E. Faulk
Paul D. Faulk
BY Kimmel & Crowell
ATTORNEYS

United States Patent Office 2,730,836
Patented Jan. 17, 1956

2,730,836
GOOSE CALLER

Clarence E. Faulk and Paul Dudley Faulk,
Lake Charles, La.

Application July 12, 1954, Serial No. 442,878

1 Claim. (Cl. 46—180)

This invention relates to a goose caller.

An object of this invention is to provide a goose caller which embodies a vibratory reed with a sound chamber forwardly of the reed so that blowing through the device will effect vibration of the reed and production of a sound simulating the call of a goose.

Another object of this invention is to provide a goose caller having a sound or resonating chamber formed out of wood which will produce a sound simulating that of a goose.

A further object of this invention is to provide a goose caller which is simple in construction so that it can be made and sold at low cost and will not get out of order.

With the above and other objects in view, our invention consists in the arrangement, combination and details of construction disclosed in the drawing and specification, and then more particularly pointed out in the appended claim.

In the drawing:

Figure 1 is a detail plan view of a goose caller constructed according to an embodiment of this invention.

Figure 2 is a sectional view taken on the line 2—2 of Figure 1.

Figure 3 is a sectional view taken on the line 3—3 of Figure 2.

Figure 4 is a plan view of the inner grooved tongue.

Figure 5 is a transverse section of the reed.

Figure 6 is a fragmentary sectional view taken on the line 6—6 of Figure 4.

Referring to the drawing, the numeral 10 designates generally a tubular mouth piece which is open at each end and is provided at its forward end with an annular reinforcing band 11.

A tubular sound box 12 projects from the forward end of the mouth piece 10 and is formed with a reduced diameter rear portion 13 telescoping into the forward end of the mouth piece 10. The sound box or resonating member 12 is formed of relatively closely grained wood, whereas the mouth piece 10 may be formed of plastic or the like.

An elongated tongue 14 is disposed partly within the sound box 12 and partly within the mouth piece 10. The tongue 14 is provided with a longitudinal groove 15, and in transverse section the tongue 14 is slightly greater than a semi-circle as shown in Figure 3.

The rear end of the tongue 14 tapers to a relatively thin point or edge as indicated at 16, and the rear end of the groove or channel 15 terminates forward a substantial distance from the rear end 16 of tongue 14.

One side 21 of the tongue 14 is formed on a long curve as shown at 22, whereas the opposite side of tongue 14 is formed with two obtusely related flat surfaces 23 and 24. The variation of the sides of the channel 15 at the rear thereof prevents any choking or jamming of the reed on the tongue.

A vibratory reed generally indicated at 17 overlies the tongue 14 extending across the groove 15 and the reed 17 is held within the rear portion of the sound box 12 by means of a wedge 18.

The reed 17, as shown in Figure 5, tapers outwardly from the upper and lower surfaces thereof as indicated at 19 and 20 so as to provide a reed which will vibrate in the desired degree.

The reed 17 is preferably formed out of composition material such as a hard rubber composition, and preferably the tongue 14 is formed out of wood such as mahogany or the like. With the use of mahogany, tongue 14 has a tendency to lower the tonal vibrations of the reed 17 so that the vibrations which resonate in the sound box 12 will very closely simulate the call of a goose.

In the use of this caller the mouth piece is extended at its rear end in the mouth and air is blown forwardly through the mouth piece 10 and the sound box 12. As the air blows forwardly, reed 17 will be rapidly vibrated and the result will be that simulating the sound of a goose call.

The tapering of the longitudinal edges and the rear end of the reed 17 assures the rapid vibration of the reed, whereas the relatively thicker central body portion 21 of the reed provides for strength in the reed so that the reed will not break as it rapidly vibrates.

What is claimed is:

A goose caller comprising a tubular mouthpiece, a tubular fibrous sound box telescoping into the forward end of said mouthpiece, a semi-cylindrical tongue removably disposed partly in said mouthpiece and partly in said sound box, the inner side of said tongue being longitudinally channeled and tapering toward the rear end, said channel terminating forwardly of the rear end of said tongue, said tongue having the inner face on one side of said channel formed of a pair of intersecting angularly related planes with the inner face on the opposite side of said channel formed in a continuous curve, a reed overlying the channel of said tongue, and a wedge securing said reed and tongue in said sound box.

References Cited in the file of this patent

UNITED STATES PATENTS

| | | |
|---|---|---|
| 2,385,752 | Wilson | Sept. 25, 1945 |
| 2,493,472 | Yentzen | Jan. 3, 1950 |
| 2,598,268 | Kendrick | May 27, 1952 |
| 2,606,400 | Olt | Aug. 12, 1952 |